(No Model.)

M. B. HANCOCK.
WHEEL ATTACHMENT FOR SLEIGHS.

No. 365,471. Patented June 28, 1887.

WITNESSES:
C. Bendixon
H. P. Denison

INVENTOR
Martha B. Hancock
BY
Duell, Laass & Duell
ATTORNEYS

United States Patent Office.

MARTHA B. HANCOCK, OF SYRACUSE, NEW YORK.

WHEEL ATTACHMENT FOR SLEIGHS.

SPECIFICATION forming part of Letters Patent No. 365,471, dated June 28, 1887.

Application filed May 11, 1887. Serial No. 237,840. (No model.)

*To all whom it may concern:*

Be it known that I, MARTHA B. HANCOCK, of Syracuse, in the county of Onondaga, in the State of New York, have invented new and useful Improvements in Wheel Attachments for Sleighs, of which the following, taken in connection with the accompanying drawings, is a full, clear, and exact description.

This invention relates to the class of wheel attachments for sleighs in which the wheels are journaled on arms pivoted on the sleigh in such a manner as to allow the said arms to carry the wheels either completely above the treads of the runners, or bring the treads of the wheels below the treads of the runners, and thus adapt the sleigh to be easily run either on snow or on bare ground.

The invention consists in the improved construction and combination of parts, as hereinafter described, and specifically set forth in the claims.

Figure 1:
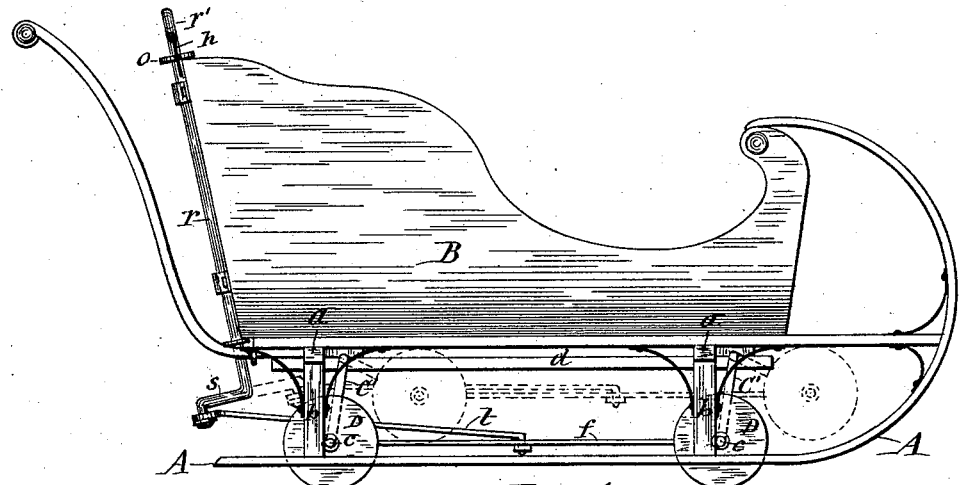
Figure 2:
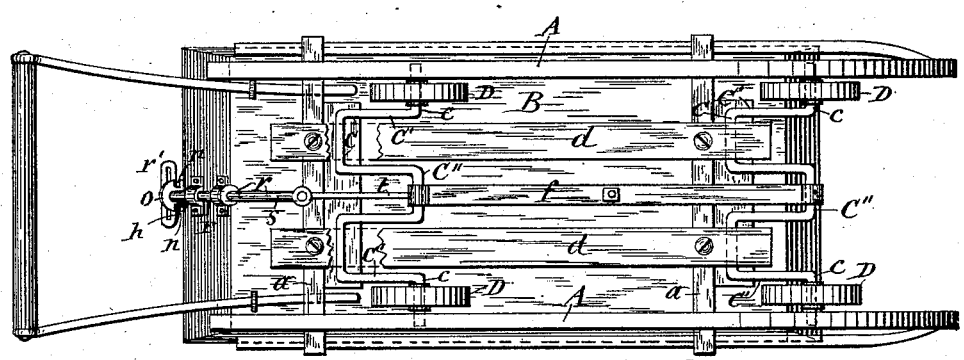
Figure 3:
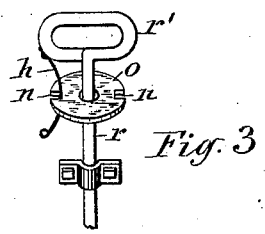

In the accompanying drawings, Figure 1 is a side elevation of a sleigh embodying my improvements. Fig. 2 is an inverted plan view of the same with the carriage folded or raised to carry the wheels completely above the treads of the runners; and Fig. 3 is a detail view of the catch for locking the adjusting-rod.

Similar letters of reference indicate corresponding parts.

A A represent the runners of the sleigh; B, the body supported on the cross-bars $a\,a$, framed to the upper ends of the knees $b\,b$, which are mounted on the runners in the usual and well-known manner.

To the under side of the body B, I connect my improved folding carriage, designed to be used interchangeably with the runners as the condition of the road may require. Said carriage consists, essentially, of the arms C' C', hinged on the sleigh above the runners A A, so as to swing in directions parallel with the runners, and coupled together to swing simultaneously, said arms being provided with journals $c\,c$, on which the wheels D D are mounted. However, I prefer to form each pair of arms C' C' in one piece by bending an axle into the end cranks, C' C', terminating with horizontal journals $c\,c$, and an intermediate crank, C'', with horizontal portions C C between the cranks. The two cranked axles I pivotally connect to the under side of the body B by suitable clip-bars, $d\,d$, secured to the body lengthwise thereof and extending across the horizontal portions of the axles and boxed thereon. A bar, $f$, is connected at opposite ends with the intermediate cranks, C'' C'', and thus couples the two axles together so as to compel the crank-arms thereof to swing in unison on their pivots. The said arms are adapted to be swung upward sufficiently to carry the wheels completely above the treads of the runners, as represented by dotted lines in Fig. 1 of the drawings, and thus permit the sleigh to be used in its ordinary condition for running on snow and ice. By swinging the crank-arms into upright positions, as shown by full lines in Fig. 1 of the drawings, the treads of the wheels D D are made to project below the treads of the runners A A, and thus allow the sleigh to be run on wheels when required to be moved over bare ground. The crank-arms are sustained in their upright position by the ends of the journals $c\,c$ resting against the front of the knees $b\,b$, which serve as stops to arrest the further rearward movement of the crank-arms. To facilitate the adjustment of the aforesaid crank-arms to their before-described positions, I pivot on the body B, preferably on the rear end thereof, a vertical rod, $r$, which is provided with a crank, $s$, at its lower end, and this crank is connected with the coupling-bar $f$ by a rod, $t$. By turning the vertical rod $r$ on its axis the crank $s$ thereof imparts a reciprocating motion to the connecting-rod $t$, and thereby throws the crank-arms C' C' into the desired position. A suitable catch, $h$, is connected to the rod $r$, or its handle $r'$, and adapted to engage with notches $n$ in the collar $o$ affixed to the body B. The engagement of said catch with one of the notches $n$ serves to lock the rod $r$ so as to maintain the arms C' C' in their adjusted position. I do not, however, limit myself to the described construction of the catch, as it is obvious that the same is susceptible of many modifications.

What I claim as new is—

1. In combination with a sleigh, axles formed, respectively, with end cranks, an intermediate crank and journals on said end cranks, clips pivotally connecting the intermediate horizontal portions of the cranked axles to the under side of the body, a bar coupling together the intermediate cranks of the axles, wheels on the journals, and stops on the sleigh adapted to sustain the end cranks in their upright position, as set forth and shown.

2. In combination with a sleigh, axles formed, respectively, with end cranks, an intermediate crank and journals on the end cranks, wheels on said journals, clips pivotally connecting the intermediate horizontal portions of the axles to the under side of the body, a bar coupling together the intermediate cranks of the axles, a lever connected with the sleigh and with the aforesaid cranked axles for adjusting the latter, and a stop on the sleigh adapted to sustain the end cranks of the axles in their upright position, as set forth.

3. In combination with a sleigh, crank-axles pivotally connected thereto and coupled together to swing simultaneously, wheels journaled on said axles, a vertical rod pivoted on the body and provided with a crank, a rod connecting said latter crank with the coupling of the crank-axles, and a catch on the sleigh adapted to lock the vertical pivoted rack in different positions, substantially as and for the purpose set forth.

In testimony whereof I have hereunto signed my name and affixed my seal, in the presence of two attesting witnesses, at Syracuse, in the county of Onondaga, in the State of New York, this 7th day of May, 1887.

MARTHA B. HANCOCK. [L. S.]

Witnesses:
JAMES DEVINE,
T. E. HANCOCK.